(12) United States Patent
Pantea et al.

(10) Patent No.: US 11,879,868 B2
(45) Date of Patent: Jan. 23, 2024

(54) ACOUSTICS-BASED NONINVASIVE WAFER DEFECT DETECTION

(71) Applicant: Triad National Security, LLC, Los Alamos, NM (US)

(72) Inventors: Cristian Pantea, Los Alamos, NM (US); John James Greenhall, Santa Fe, NM (US); Alan Lyman Graham, Los Alamos, NM (US); Dipen N. Sinha, Bay Shore, NY (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 460 days.

(21) Appl. No.: 17/321,332

(22) Filed: May 14, 2021

(65) Prior Publication Data

US 2021/0356435 A1 Nov. 18, 2021

Related U.S. Application Data

(60) Provisional application No. 63/025,144, filed on May 14, 2020.

(51) Int. Cl.
*G01N 29/12* (2006.01)
*G01N 29/24* (2006.01)
(Continued)

(52) U.S. Cl.
CPC .............. *G01N 29/12* (2013.01); *G01N 29/07* (2013.01); *G01N 29/225* (2013.01);
(Continued)

(58) Field of Classification Search
CPC ...... G01N 29/12; G01N 29/07; G01N 29/225; G01N 29/2418; G01N 29/2437;
(Continued)

(56) References Cited

U.S. PATENT DOCUMENTS 5,996,415 A * 12/1999 Stanke ................. G01N 29/041
73/644
8,508,239 B2 * 8/2013 Valcore .............. G01N 29/2475
73/587

(Continued)

FOREIGN PATENT DOCUMENTS

DE 102016224988 A1 * 6/2018 ............. G01B 17/00

OTHER PUBLICATIONS

Van Den Abeele, K.E.-A. et al, "Nonlinear Elastic Wave Spectroscopy (NEWS) Techniques to Discern Material Damage, Part I: Nonlinear Wave Modulation Spectroscopy (NWMS)," Research in Nondestructive Evaluation, 12:1, 17-30, (2000).

(Continued)

*Primary Examiner* — Jacques M Saint Surin
(74) *Attorney, Agent, or Firm* — Alston & Bird LLP

(57) ABSTRACT

Techniques are provided for detecting wafer defects. Example techniques include exciting a wafer using an acoustic signal to cause the wafer to exhibit vibrations, measuring one or more of linear frequency response metrics or nonlinear frequency responses metrics associated with the vibrations, and identifying any defects in the wafer based at least in part on one or more of the linear frequency response metrics or nonlinear frequency responses metrics. In embodiments, the wafer includes bismuth telluride ($Bi_2Te_3$).

20 Claims, 14 Drawing Sheets

(51) Int. Cl.
*G01N 29/07* (2006.01)
*G01N 29/22* (2006.01)
*G01N 29/27* (2006.01)
*G06N 20/00* (2019.01)
*G01N 29/46* (2006.01)

(52) U.S. Cl.
CPC ..... *G01N 29/2418* (2013.01); *G01N 29/2437* (2013.01); *G01N 29/27* (2013.01); *G01N 29/46* (2013.01); *G06N 20/00* (2019.01); *G01N 2291/011* (2013.01); *G01N 2291/023* (2013.01); *G01N 2291/0289* (2013.01); *G01N 2291/101* (2013.01)

(58) Field of Classification Search
CPC ...... G01N 29/27; G01N 29/46; G01N 29/348; G01N 29/4445; G01N 29/4481; G01N 29/2607; G01N 2291/023; G01N 2291/02491; G01N 2291/011; G01N 2291/014; G01N 2291/101; G06N 20/00

USPC .......................................................... 73/579
See application file for complete search history.

(56) References Cited

U.S. PATENT DOCUMENTS 8,912,495 B2\* 12/2014 Lange ................ G01N 21/9503
250/559.4
11,346,818 B2\* 5/2022 Pacheco ............. G01R 31/2889

OTHER PUBLICATIONS

Van Den Abeele, K.E.-A. et al, "Nonlinear Elastic Wave Spectroscopy (NEWS) Techniques to Discern Material Damage. Part II: Single Mode Nonlinear Resonance Acoustic Spectroscopy," Research in Nondestructive Evaluation, 12:1, 31-42, (2000).
Greenhall, J. et al, "Nonlinear acoustic crack detection in thermoelectric wafers," Los Alamos National Laboratory 177th Meeting of the Acoustical Society of America, 12 pgs., (May 14, 2019).

\* cited by examiner

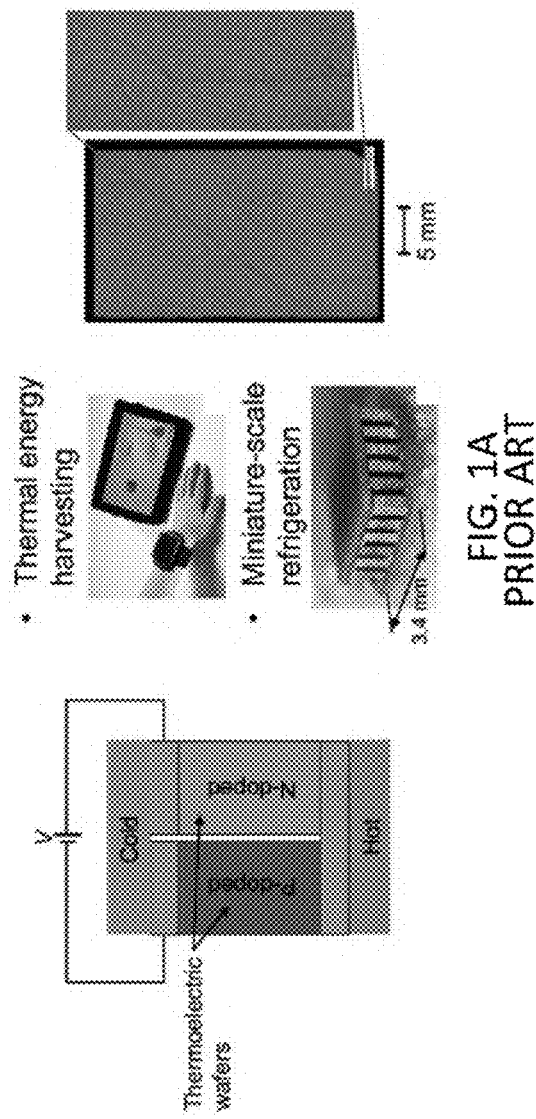
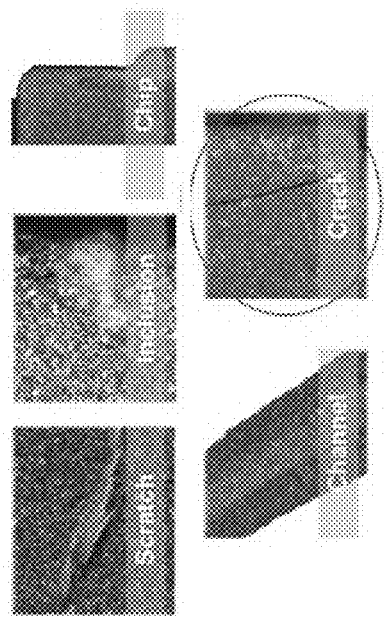
FIG. 1A
PRIOR ART
FIG. 1B
PRIOR ART

ACOUSTICS-BASED NONINVASIVE WAFER DEFECT DETECTION

CROSS-REFERENCE TO RELATED APPLICATIONS

The present application claims priority to U.S. Provisional Application Ser. No. 63/025,144, titled "ACOUSTICS-BASED NONINVASIVE WAFER DEFECT DETECTION," filed May 14, 2020, the contents of which are incorporated herein by reference in their entirety.

STATEMENT AS TO RIGHTS TO INVENTIONS MADE UNDER FEDERALLY SPONSORED RESEARCH OR DEVELOPMENT

This invention was made with government support awarded by the National Nuclear Security Administration and the Department of Defense. The government has certain rights in the invention. The United States government has rights in this invention pursuant to Contract No. 89233218CNA000001 between the United States Department of Energy and Triad National Security, LLC for the operation of Los Alamos National Laboratory.

BACKGROUND

A wafer is a slice of semiconductor material used for the fabrication of electronic circuits, the manufacture of solar panels, substrates of microelectronic devices, and more. Wafers generally include a high aspect ratio between lateral dimensions and thickness. Wafers may experience defects which impact usability in various manners (see, e.g., FIGS. 1A and 1B). Wafer defect inspection system detects physical defects (foreign substances called particles) and pattern defects on wafers and obtains the position coordinates (X, Y) of the defects. Defects can be divided into random defects and systematic defects.

Random defects are mainly caused by particles that become attached to a wafer surface, so their positions cannot be predicted. The major role of a wafer defect inspection system is to detect defects on a wafer and find out their positions (position coordinates).

On the other hand, systematic defects are caused by the conditions of the mask and exposure process and will occur in the same position on the circuit pattern of all the dies projected. They occur in locations where the exposure conditions are very difficult and require fine adjustment.

The wafer defect inspection system detects defects by comparing the image of the circuit patterns of the adjacent dies. As a result, systematic defects sometimes cannot be detected using a conventional wafer defect inspection system.

Inspection can be performed on a patterned process wafer or on a bare wafer. Each of these has a different system configuration.

Conventional methods for detecting flaws in wafers include optical microscopy, x-ray computed tomography (CT), and ultrasound. Such methods suffer several drawbacks, including that optical inspection results in passage of a significant and unacceptable number of flawed wafers during processing that ultimately fail. The flaws that remain undetected in optical processing include hairline fractures, critical flaws, and internal defects that are not optically observable. Automated optical techniques based on image processing are sensitive to variations in surface texture and lighting and are limited to surface defects. Manual optical techniques are costly and time-consuming. X-ray CT requires prohibitively long measurement times. Current ultrasound crack detection techniques are categorized as either burst techniques, involving an ultrasound burst that propagates through the material, or resonance techniques, where a standing ultrasound wave is established throughout the material. These ultrasound based techniques are sensitive to placement of transducers with respect to crack position and orientation, require a large number of configurations to ensure that cracks are properly interrogated, can require uniform geometry and material properties between wafers, and mistake nonlinearities within materials for cracks.

The inventors have identified a number of deficiencies and problems associated with existing wafer defect detection systems and methodologies. Through applied effort, ingenuity, and innovation, many of these identified problems have been solved by developing solutions that are included in embodiments of the present disclosure, many examples of which are described in detail herein.

SUMMARY

Embodiments of the present disclosure are directed to noninvasive, fast, and efficient detection of defects in wafers. Example techniques include exciting a wafer using an acoustic signal to cause the wafer to exhibit vibrations, measuring one or more of linear frequency response metrics or nonlinear frequency responses metrics associated with the vibrations, and identifying any defects in the wafer based at least in part on one or more of the linear frequency response metrics or nonlinear frequency responses metrics.

In embodiments, the wafer comprises bismuth telluride ($Bi_2Te_3$).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 2A:
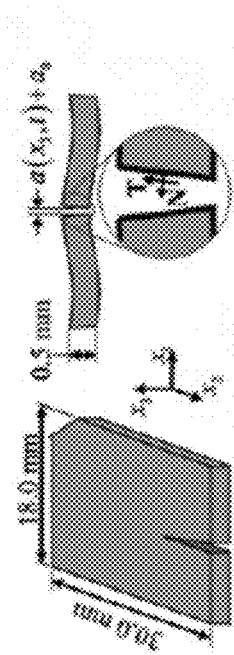
Figure 2C:
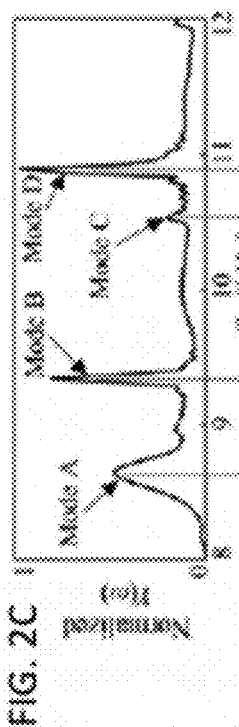
Figure 2D:
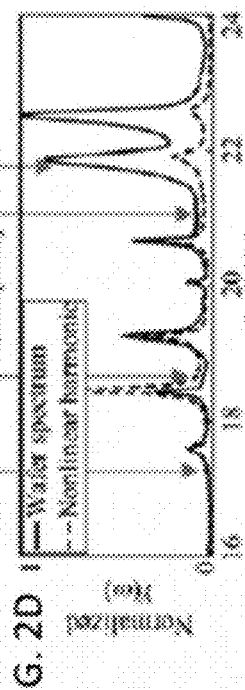
Figure 2E:
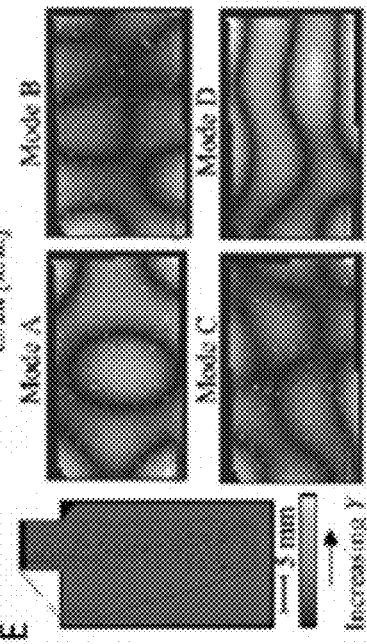
Figure 2B:
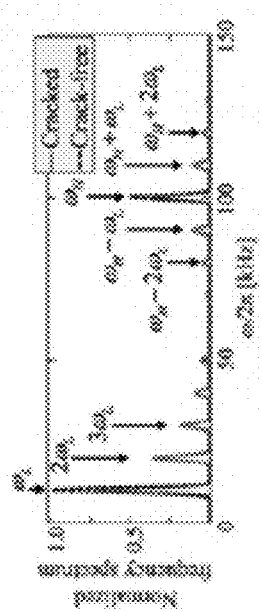

Having thus described the disclosure in general terms, reference will now be made to the accompanying drawings, which are not necessarily drawn to scale, and wherein:

FIG. 1A illustrates aspects of thermoelectric wafers and applications;

FIG. 1B illustrates exemplary wafer defects;

FIG. 2A illustrates an example cracked bismuth telluride wafer;

FIG. 2B illustrates a frequency spectrum of a cracked and crack free bismuth telluride wafer;

FIG. 2C illustrates a pump-band wafer spectrum of a cracked bismuth telluride wafer;

FIG. 2D illustrates harmonic-band wafer spectrum and measured nonlinear harmonic signal of a cracked bismuth telluride wafer;

FIG. 2E illustrates an optical microscope image of a cracked bismuth telluride wafer and images of the displacement amplitudes for the four resonant modes shown in FIG. 2C.

Figure 3:
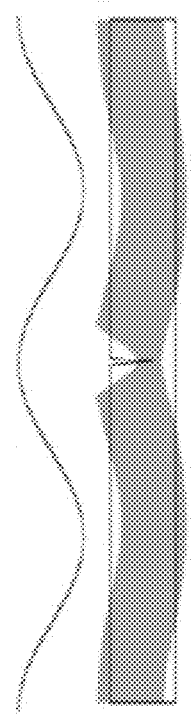
Figure 4:
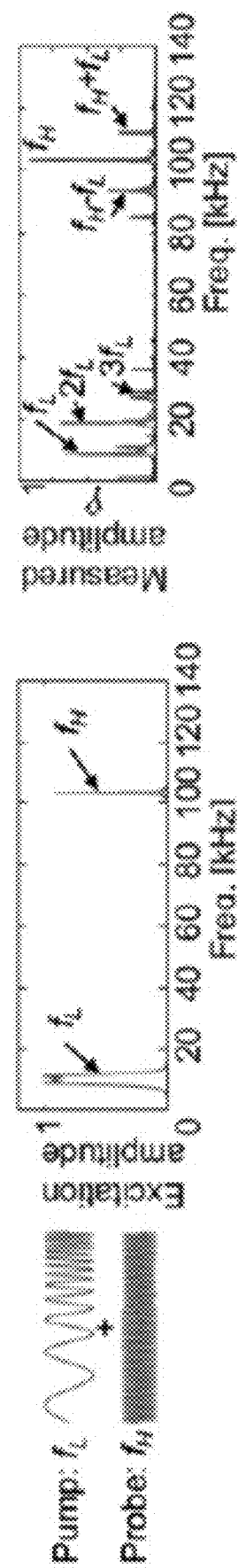
Figure 5:
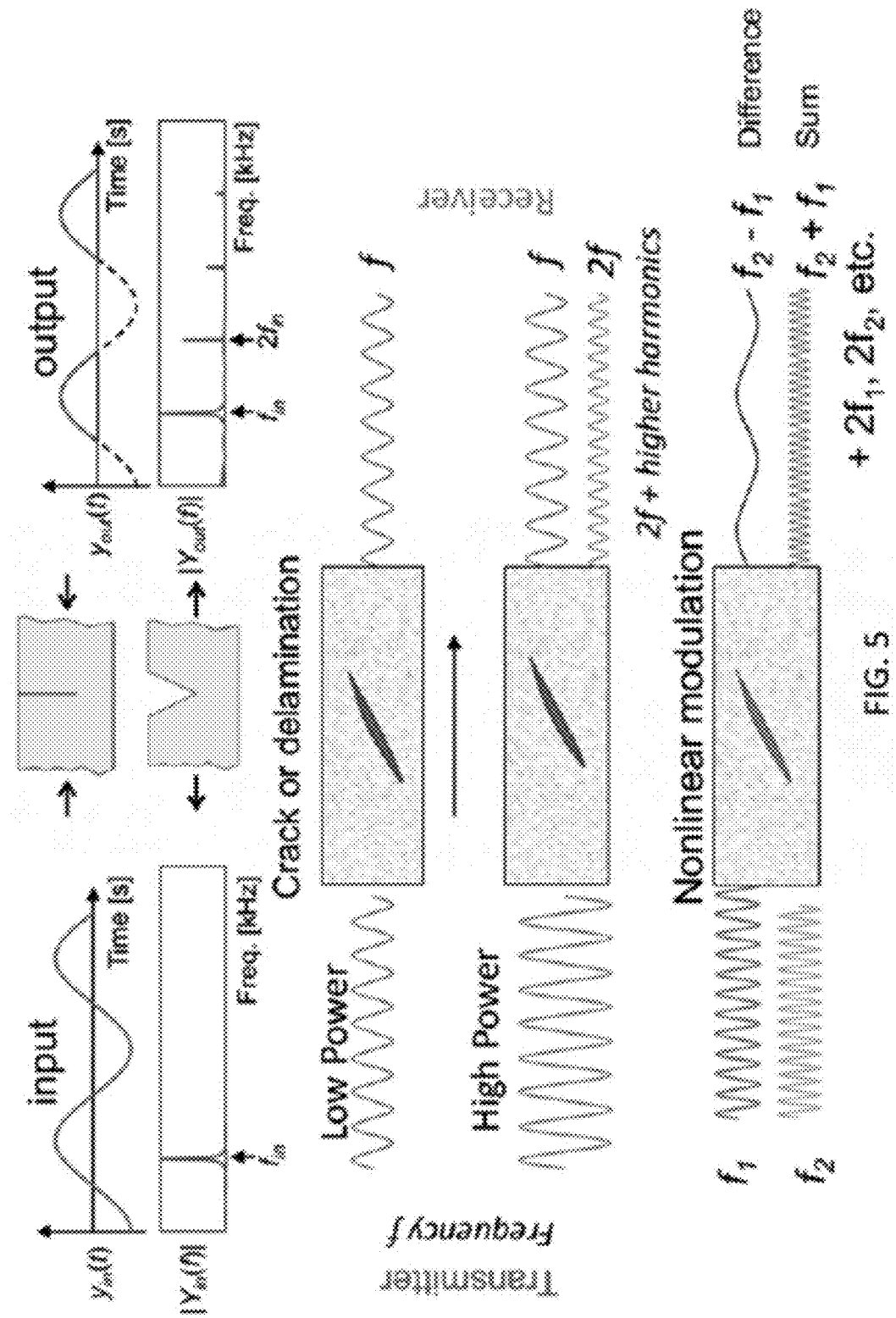
Figure 6:
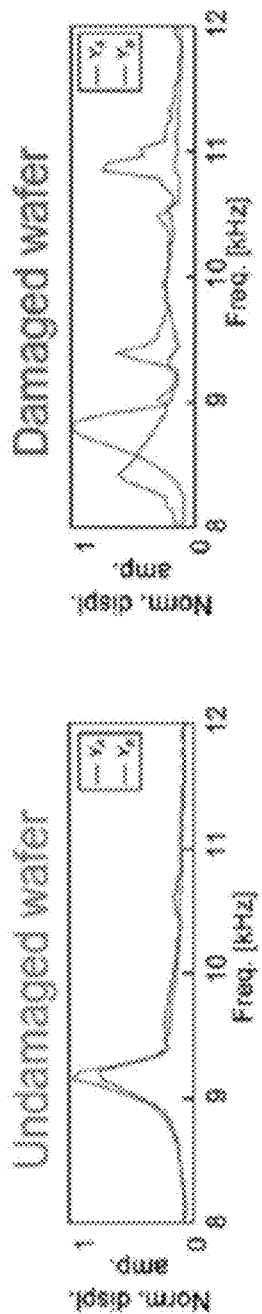
Figure 7:
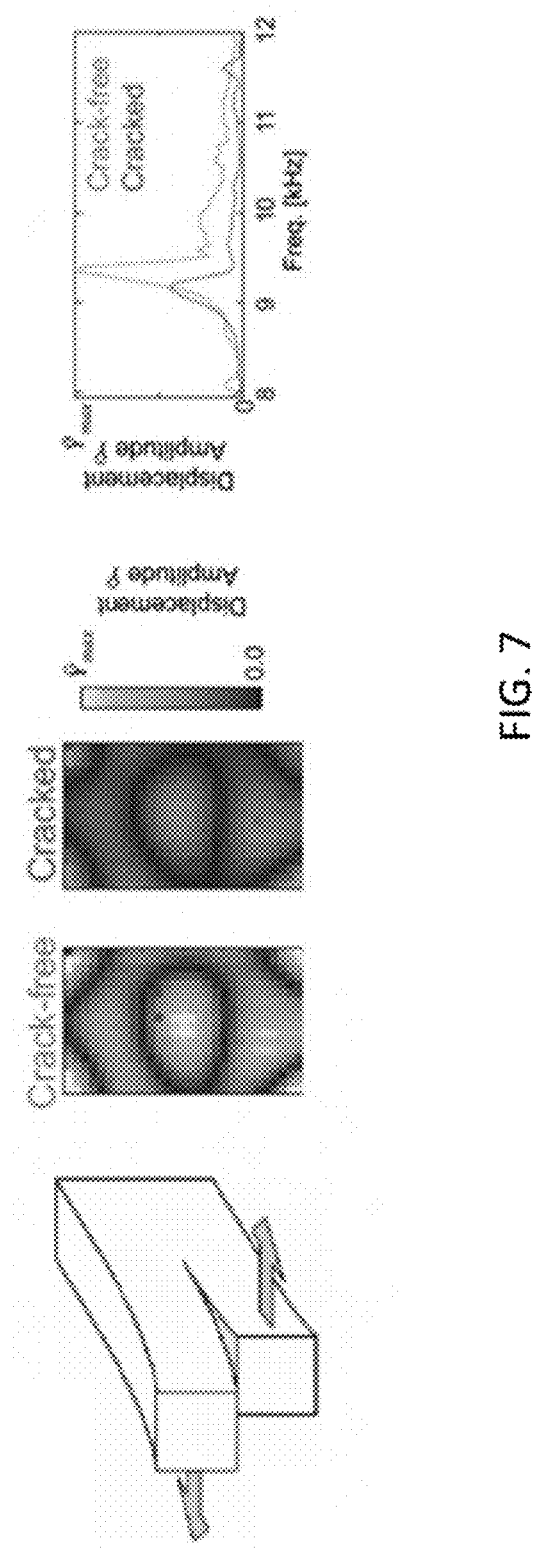
Figure 8A:
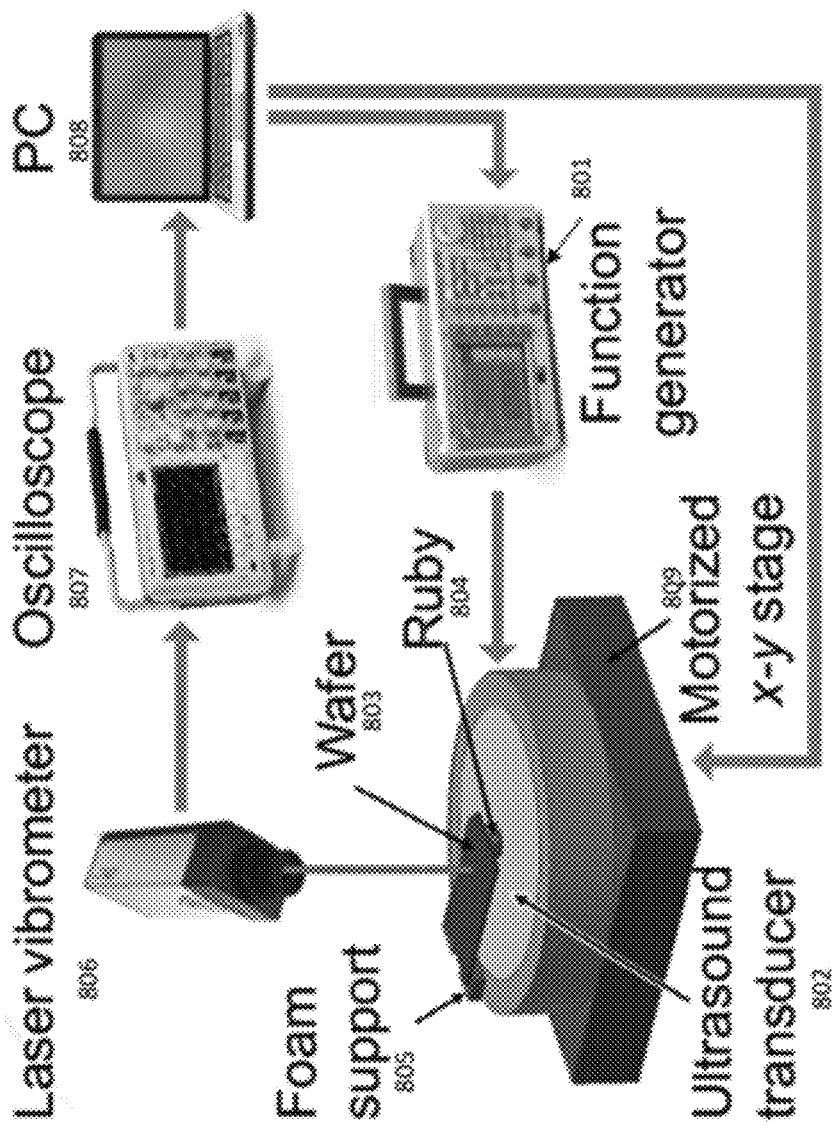
Figure 8B:
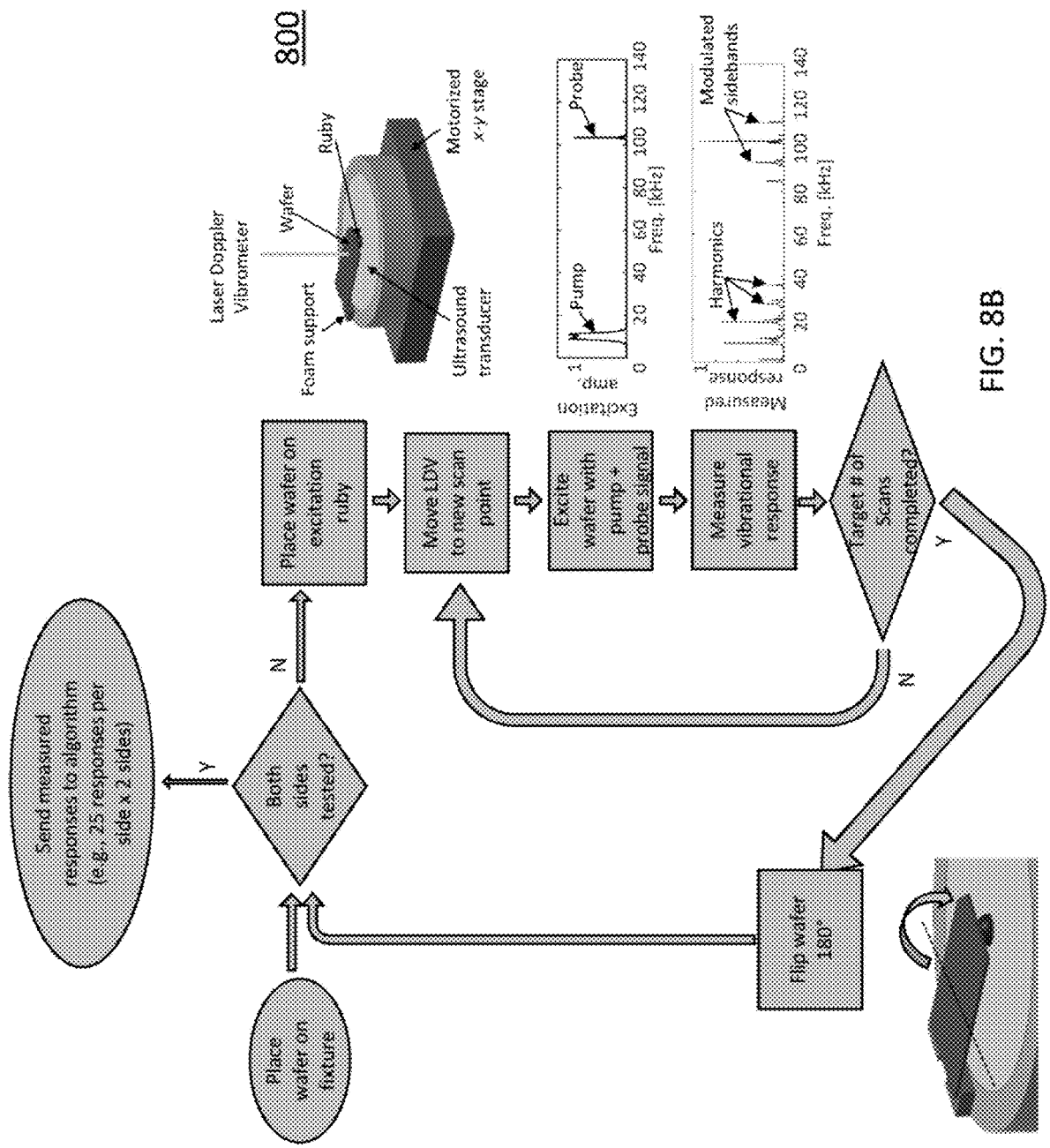
Figure 9C:
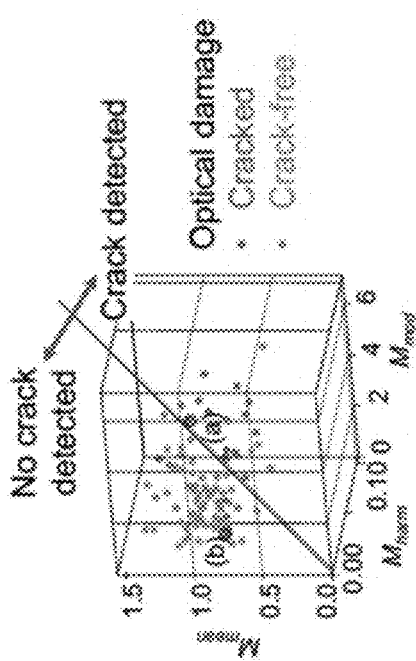
Figure 9A:
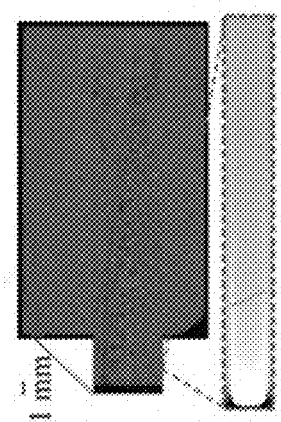
Figure 9B:
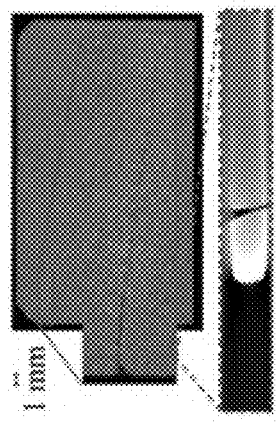
Figure 10:
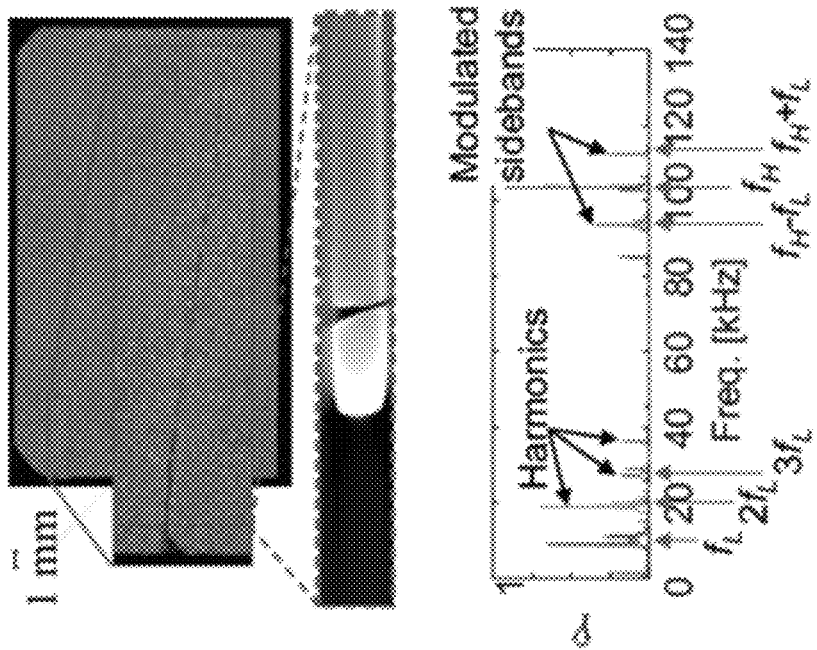
Figure 11B:
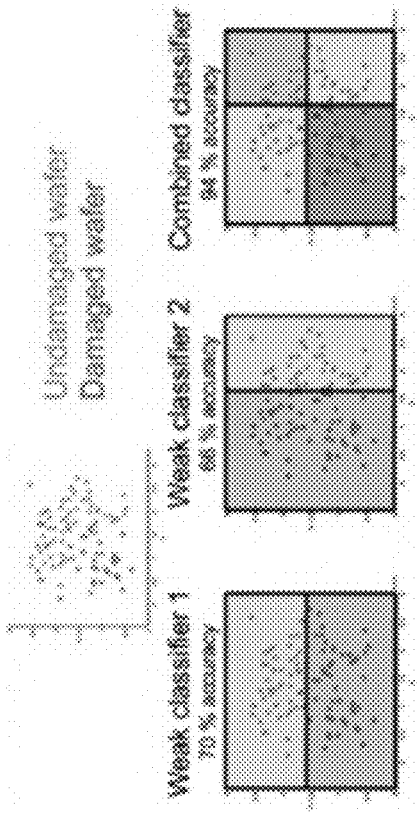
Figure 11A:
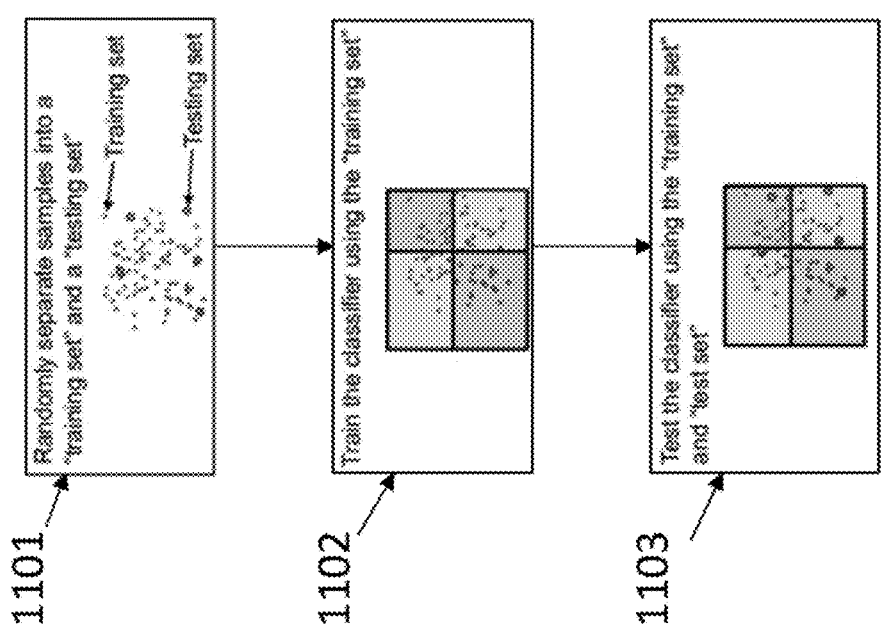
Figure 12:
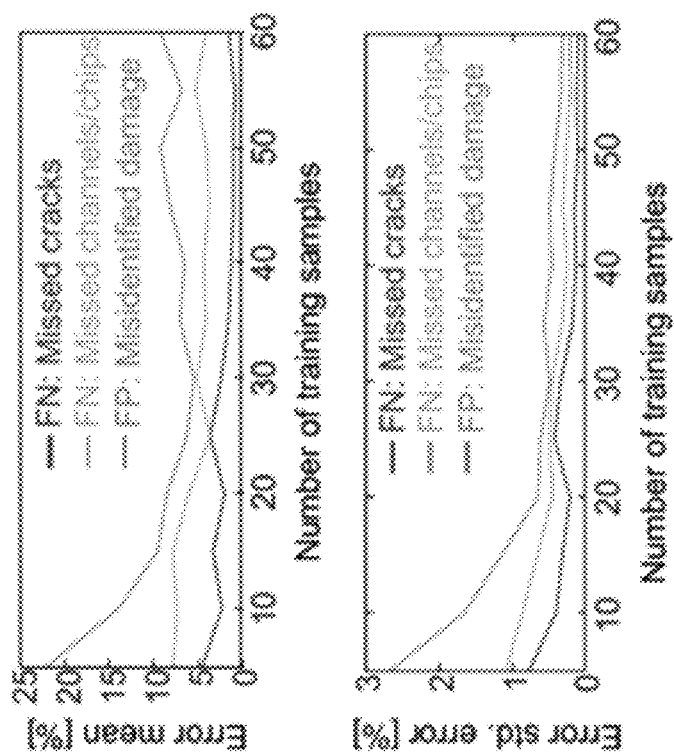
Figure 13:
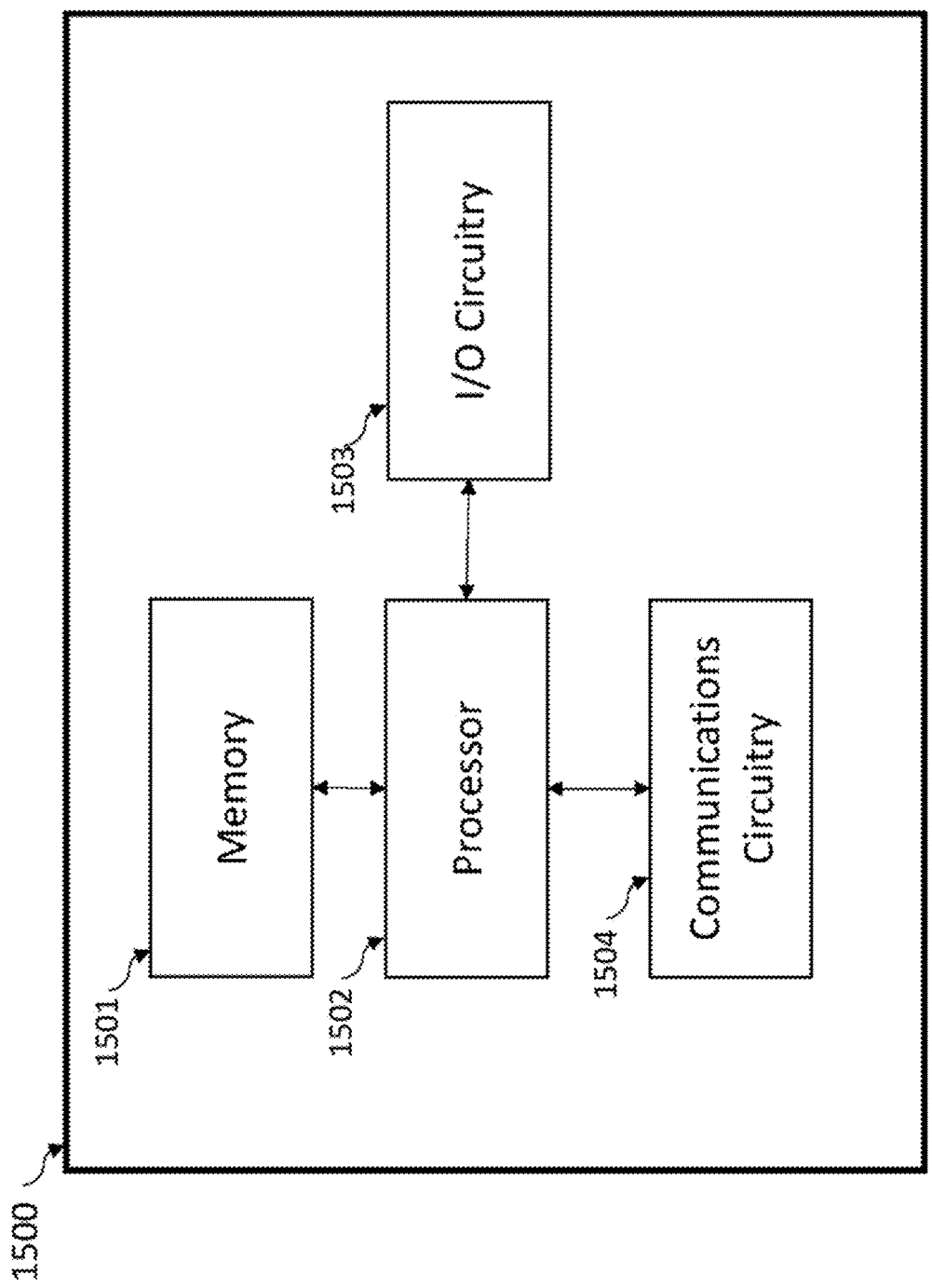
Figure 14:
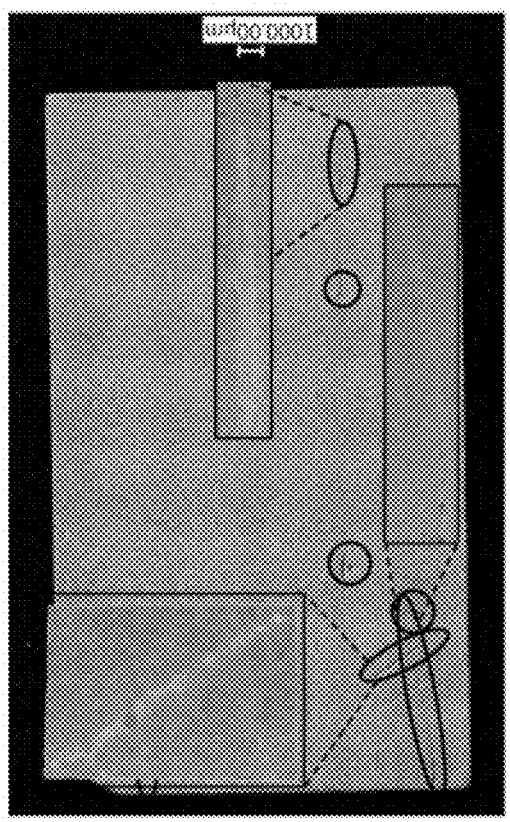
Figure 15:
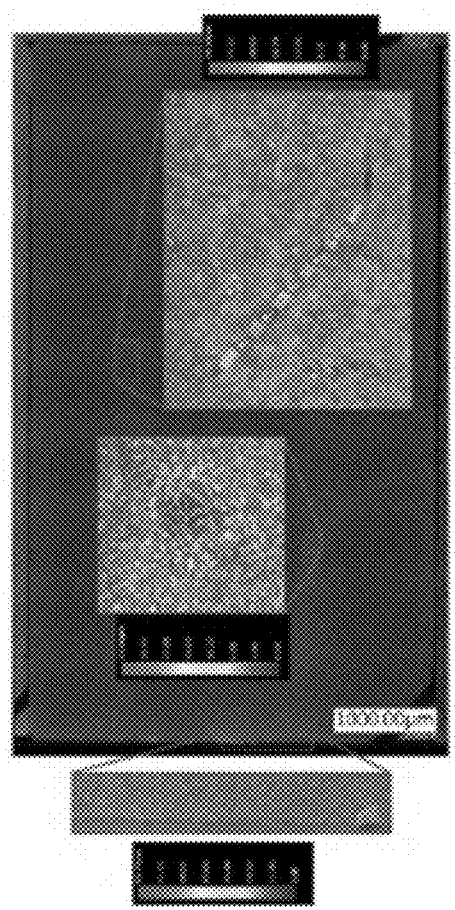

FIG. 3 illustrates properties associated with wafer defects;

FIG. 4 illustrates properties associated with wafer defects;

FIG. 5 illustrates properties associated with wafer defects;

FIG. 6 illustrates properties associated with wafer defects;

FIG. 7 illustrates properties associated with wafer defects;

FIGS. 8A-8B illustrate an exemplary system architecture for use with embodiments of the present disclosure;

FIGS. 9A, 9B, and 9C illustrate exemplary crack detection results associated with embodiments disclosed herein;

FIG. 10 illustrates exemplary crack detection results associated with embodiments disclosed herein;

FIGS. 11A and 11B illustrate exemplary machine learning techniques for use with embodiments of the present disclosure;

FIG. 12 illustrates exemplary machine learning results associated with embodiments disclosed herein;

FIG. 13 illustrates an exemplary apparatus in which embodiments of the present disclosure may operate;

FIG. 14 illustrates exemplary wafer defects for inspection according to embodiments disclosed herein; and FIG. 15 illustrates exemplary wafer defect inspection according to embodiments disclosed herein.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Embodiments of the present disclosure are directed to noninvasive, fast, and efficient detection of defects in wafers. Embodiments may employ a combination of linear and nonlinear acoustics as well as optics. Metrics for use in determining wafer defects of the present disclosure comprise one or more of nonlinear harmonic amplitude, nonlinear modulation or mean frequency spectrum amplitude. An apparatus for use with embodiments of the present disclosure comprises a two-dimensional (2D) motorized stage and a piezoelectric transducer equipped with a point contact excitation. The point contact excitation may comprise a ruby hemisphere. The wafers may comprise bismuth telluride ($Bi_2Te_3$).

Embodiments herein rely on mechanically exciting wafers with a low frequency pump signal that drive a crack to "breathe" by opening and closing periodically and a high frequency probe signal that interrogates the breathing crack. Interaction between the pump signal, the probe signal, and the crack leads to generation of acoustic nonlinearities in the wafer. In contrast to existing acoustic crack detection techniques, embodiments herein use standing waves within the wafers to facilitate simultaneous crack detection throughout the wafer, which reduces total inspection time. Embodiments herein do not require uniform dimensions and material properties between wafers. Embodiments herein do not require that the transmitter/receiver be affixed to the wafers, which can lead to wafer damage. Embodiments herein integrates multiple damage metrics to identify cracks within the wafers.

Embodiments of the present disclosure enable identification of wafer flaws or defects that would fracture due to processing induced stresses. Such fractures would otherwise lead to array failure. Embodiments prevent passage of critically flawed wafers downstream and can be limited to relatively short inspection times (e.g., less than 3 minutes). Embodiments of the present disclosure enable rapid detection of flaws and defects at early stages of processing complex structures that involve wafers of different materials.

Embodiments of the present disclosure overcome the aforementioned challenges and more through the use of a relatively inexpensive and rapid acoustic system that ensures wafers with critical flaws and hairline fractures do not pass undetected.

Experimental results are included herein related to optical microscopy and acoustic inspection of ten bismuth telluride ($Bi_2Te_3$) or "BiTe" wafers to detect the presence of critical defects including cracks, channels, and holes. Based on numerical simulations of the manufacturing process, defects with depths greater than 110 μm are deemed critical and are likely to result in failure of the BiTe wafer. The optical microscopy inspection entails capturing low-resolution 2D images of the wafers, from which regions of interest are manually identified to image in high-resolution 3D to measure the defect depths.

The acoustic inspection entails exciting the wafers with acoustic waves and then measuring three components of the wafer response: the nonlinear harmonic amplitude, the nonlinear modulation amplitude, and the mean frequency spectrum amplitude. From the optical microscopy inspection, no cracks were observed in any of the wafers and no channels or holes deeper than the 110 μm threshold were observed, which indicates that all of the wafers are "undamaged." Alternatively, the acoustic inspection indicates that 9/10 of the wafers are undamaged and one wafer is damaged. As a result, agreement between the optical microscopy and acoustic inspection techniques is observed with 90.0% accuracy, which is comparable to the 88.3% accuracy measured on the previous large pool of BiTe wafers (94 samples).

Exemplary Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

It should be appreciated that the term "programmatically expected" indicates machine prediction of occurrence of certain events.

As used herein, the term "likelihood" refers to a measure of probability for occurrence of a particular event.

The term "machine learning model" refers to a machine learning task. Machine learning is a method used to devise complex models and algorithms that lend themselves to prediction. A machine learning model is a computer-implemented algorithm that can learn from data without relying on rules-based programming. These models enable reliable, repeatable decisions and results and uncovering of hidden insights through machine-based learning from historical relationships and trends in the data.

A machine learning model is initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). In some embodiments, the machine learning model is a regression model.

The term "target variable" refers to a value that a machine learning model is designed to predict. In the present embodiments, historical data is used to train a machine learning model to predict the target variable. Historical observations of the target variable are used for such training.

The terms "dataset" and "data set" refer to a collection of data. A data set can correspond to the contents of a single database table, or a single statistical data matrix, where every column of the table represents a particular variable (e.g., a predictor variable), and each row corresponds to a given member (e.g., a data record) of the data set in question. The data set can be comprised of tuples (e.g., feature vectors). In embodiments, a data set lists values for each of the variables (e.g., features), such as height and weight of an object, for each member (e.g., data record) of the data set. Each value is known as a datum. The data set may comprise data for one or more members, corresponding to the number of rows.

The term "data record" refers to an electronic data value within a data structure. A data record may, in some embodiments, be an aggregate data structure (e.g., a tuple or struct). In embodiments, a data record is a value that contains other values. In embodiments, the elements of a data record are referred to as fields or members. In embodiments, data may come in records of the form: $(x, Y)=(x_1, x_2, x_3, \ldots, x_k, Y)$ where the dependent variable Y is the target variable that the model is attempting to understand/classify, or generalize. The vector x (e.g., feature vector) is composed of the features $x_1, x_2, x_3$, etc. that are used for the task. The features may be representative of attributes associated with a data record.

The term "feature vector" refers to an n-dimensional vector of features that represent an object. N is a number. Many algorithms in machine learning require a numerical representation of objects, and therefore the features of the feature vector may be numerical representations.

In the pattern recognition field, a pattern is defined by the feature $x_i$ which represents the pattern and its related value $y_i$. For a classification problem, $y_i$ represents a class or more than one class to which the pattern belongs. For a regression problem, $y_i$ is a real value. For a classification problem, the task of a classifier is to learn from the given training dataset in which patterns with their classes are provided. The output of the classifier is a model or hypothesis h that provides the relationship between the attributes $x_i$ and the class $y_i$. The hypothesis h is used to predict the class of a pattern depending upon the attributes of the pattern.

Neural networks, naive Bayes, decision trees, and support vector machines are popular classifiers.

In decision analysis, a decision tree can be used to visually and explicitly represent decisions and decision making. In data mining, a decision tree describes data (but the resulting classification tree is used as an input for decision making).

In embodiments, a decision tree is in the form of a tree structure, where each node is either a leaf node (indicates the prediction of the model), or a split node (specifies some test to be carried out on a single attribute-value), with two branches. A decision tree can be used to make a prediction by starting at the root of the tree and moving through it until a leaf node is reached, which provides the prediction for the example.

In decision tree learning, the goal is to create a model that predicts the value of a dependent variable based on several independent variables. Each leaf of the decision tree represents a value of the dependent variable given the values of the independent variables, represented by the path from the root to the leaf (passing through split nodes).

The term "classifier" refers to a class or type to which data is said to belong or with which the data is said to be associated.

The term "regression model" refers to a supervised model in which the dependent variable is a numeric variable. Regression analysis is a machine learning algorithm that can be used to measure how closely related independent variable (s) relate with a dependent variable. An extensive use of regression analysis is building models on datasets that accurately predict the values of the dependent variable. At the beginning of regression analysis, a dataset can be split into two groups: a training dataset and a testing dataset. The training dataset can be used to create a model to figure out the best approach to apply the line of best fit into the graph. Thus, it can be a straight line or a curve that easily fits into the graph of the independent variable(s) vs the dependent variable. The newly created model can be used to predict the dependent variable of the testing dataset. Then, predicted values can be compared to the original dependent variable values by using different accuracy measures like R-squared, root mean square error, root mean average error, correlation coefficient and others. If the accuracy score is not accurate enough and a stronger model wants to be built, the percentage of the datasets allocated to the training and testing datasets can be changed. For instance, if the training dataset had 70% of the dataset with the testing dataset having 30%, the training dataset can now have 80% of the dataset with the testing dataset having 20%.

Another way of obtaining a stronger model is by changing from linear regression analysis to polynomial regression analysis or from multiple linear regression analysis to multiple polynomial regression analysis. There are different regression analysis approaches for continuous variables such as Linear Regression, Multiple Linear Regression, Polynomial Regression and Multiple Polynomial Regression.

The term "classification model" refers to a supervised model in which the dependent variable is a categorical variable. A classification model may be referred to as a classifier.

The terms "classifier algorithm" or "classification algorithm" refer to a classifier algorithm which estimates a classification model from a set of training data. The "classifier algorithm" uses one or more classifiers and an associated algorithm to determine a probability or likelihood that a set of data (e.g., a plurality of input data records) belong to another set of data (e.g., a distribution represented by a data set, or a distribution represented by a true data set). Put another way, a classification problem involves distinguishing one or more classes of data from other classes of data. An example of such a classification problem may involve a model trained to distinguish a first data set from a second data set. A decision tree model where a target variable can take a discrete set of values is called a classification tree (e.g., and therefore can be considered a classifier or classification algorithm).

The term "numeric variable" refers to a variable whose values are real numbers. Numeric variables may also be referred to as real-valued variables or continuous variables.

The term "ordinal variable" refers to a variable whose values can be ordered, but the distance between values is not meaningful (e.g., first, second third, etc.).

The term "categorical variable" refers to a variable whose values are discrete and unordered. These values are commonly known as "classes."

The term "dependent variable" refers to a variable whose value depends on the values of independent variables. The dependent variable represents the output or outcome whose variation is being studied. A dependent variable may also be referred to as a response, an output variable, or a target variable.

The terms "independent variable" or "predictor variable" refer to a variable which is used to predict the dependent variable, and whose value is not influenced by other values in the supervised model. Models and experiments described herein test or determine the effects that independent variables have on dependent variables. Supervised models and statistical experiments test or estimate the effects that independent variables have on the dependent variable. Independent variables may be included for other reasons, such as for their potential confounding effect, without a wish to test their effect directly. In embodiments, predictor variables are input variables (e.g., variables used as input for a model are referred to as predictors). In embodiments, predictor or input variables are also referred to as features. Independent variables may also be referred to as features, predictors, regressors, and input variables.

The terms "supervised model," "model," and "predictive model" refer to a supervised model, which is an estimate of a relationship in which the value of a dependent variable is calculated from the values of one or more independent variables. The functional form of the relationship is determined by the specific type (e.g. decision tree, GLM, gradient boosted trees) of supervised model. Individual numeric components of the mathematical relationship are estimated based on a set of training data. The set of functional forms and numerical estimates a specific type of supervised model can represent is called its "hypothesis space."

The terms "client device" or "computing device" in this context refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "wafer" refers to a thin slice of semiconductor or ceramic used for the fabrication of integrated circuits, solar cells, thermoelectric devices, and other applications.

The term "wafer defect" refers to an artifact or property of a portion of a wafer that may render the portion or wafer defective for an intended purpose.

The term "elastic waves" refers to motion in a medium in which, when particles are displaced, a force proportional to the displacement acts on the particles to restore them to their original position. If a material has the property of elasticity and the particles in a certain region are set in vibratory motion, an elastic wave will be propagated. For example, a gas is an elastic medium (if it is compressed and the pressure is then released, it will regain its former volume), and sound is transmitted through a gas as an elastic wave.

The term "acoustic signal" refers to a signal representing an acoustic wave. Acoustic waves are elastic waves that exhibit phenomena like diffraction, reflection and interference.

The term "laser vibrometer" refers to a scientific instrument that is used to make non-contact vibration measurements of a surface.

The term "function generator" refers to a piece of electronic test equipment or software used to generate different types of electrical waveforms over a wide range of frequencies.

The term "transducer" refers to a device for converting one form of energy into another. In an electroacoustic context, this means converting sound energy into electrical energy (or vice versa). Transduction principles include electromagnetism, electrostatics and piezoelectricity.

The term "motorized x-y stage" refers to an XY table which is a motorized linear slide with linear motion based in bearings which are driven by a drive mechanism. A motorized x-y stage provides positioning along multiple axes.

The terms "bismuth telluride ($Bi_2Te_3$)," "bismuth telluride," "$Bi_2Te_3$," and "BiTe" refer to a compound of bismuth and tellurium.

Examples of Nonlinear Crack Behavior

FIG. 2A illustrates a cross section schematic of a $Bi_2Te_3$ wafer (first resonant mode approximately 1.4 kHz) with a crack of initial opening $a_0$ prior to excitation and opening $a(x_3, t)+a_0$ during excitation that extends through the wafer thickness. Several models have been developed to model the nonlinear behavior of cracks. When modeling cracks in 1D, nonlinearities are introduced by augmenting the stress-strain relationship of the material. A crack may be modeled as a bilinear spring, with high stiffness when the crack faces are in contact and low stiffness when the crack faces are not in contact. Cracks may be modeled in 2D or 3D numerically by implementing nonlinear normal N and shear T force vectors acting on a small area A of each crack face.

$$N = nAKH(a(x_3,t)+a_0) \cdot (a(x_3,t)+a_0) \quad (1)$$

and $$T = A\mu(\dot{x}, N)N \quad (2)$$

Here, n is the surface normal of the crack face, H(·) is the Heaviside function, K=dN/da is the stiffness of the closed crack ($a(x_3, t)+a_0 \leq 0$), and μ is the slip-stick friction coefficient, which is dependent on the velocity vector $\dot{x}$ between two contacting points on opposing crack faces. The wafer is excited with a single piezoelectric transducer driven by a two-tone signal (voltage) consisting of a high-amplitude, low-frequency $\omega_L$ sinusoidal "pump" signal added to a high-frequency $\omega_H$, low-amplitude "probe" signal. The pump signal generates high-amplitude perturbations in the crack opening $a(x_3, t)$ and causes the crack to "breathe," wherein it opens and closes periodically with frequency $\omega_L$. When $a(x_3, t)+a_0>0$ the crack opens and the normal and shear forces acting on the crack faces become zero and when $a(x_3, t)+a_0<0$ the crack closes and the forces become nonzero. This crack breathing results in nonlinear effects including harmonic generation and modulation.

FIG. 2B shows the theoretical frequency spectrum of the measured signal for a crack-free wafer (dashed) and for a cracked wafer (solid) using the nonlinear contact acoustic model for a 1D crack. The measured signal for the crack-free wafer consists only of the pump $\omega_L$ and probe signals $\omega_H$. For the cracked $Bi_2Te_3$ wafer harmonic signals are observed at frequencies of $(n+1)\omega_L$ for $n=1, 2, 3 \ldots$ and modulated sideband signals at frequencies of $\omega_H \pm n\omega_L$ for $n=1, 2, 3, \ldots$, as well as the peaks at the pump and probe frequencies.

Previous published techniques assume that the wavelength of the elastic waves is significantly smaller than the dimensions of the material specimen, which enables assuming purely propagating waves. Alternatively, in $Bi_2Te_3$ wafers with dimensions on the order of the elastic wavelength, standing waves are generated that form at specific frequencies corresponding to the resonance modes of the $Bi_2Te_3$ wafers. Generation of nonlinear harmonics and modulated sidebands is contingent on the crack opening perturbation amplitude being sufficiently large to periodically overcome the initial crack opening and periodically close the crack. The amplitude of the nonlinear harmonic and modulated sideband signals is dependent on the wafer spectrum of the $Bi_2Te_3$ wafer in the pump-band $\omega_L$ and probe-band $\omega_H$, and the wafer spectrum over the range frequencies where the nonlinearities will be generated, e.g., $(n+1)\omega_L$ for $n=1, 2, 3 \ldots$ for the harmonics and $\omega_N \pm n\omega_L$ for $n=1, 2, 3 \ldots$ for the modulated sidebands.

As a demonstrative example, consider generation of the second harmonic $2\omega_L$ for a pump signal of frequencies $\omega_L/2\pi \in [8, 12]$ kHz. The pump signal at $\omega_L$ drives crack breathing, which generates the second harmonic at $2\omega_L$, thus the amplitude of the second harmonic signal at $2\omega_L$ is dependent on the amplitude of the vibration at $\omega_L$. Additionally, the second harmonic waves will propagate and interfere with one another. If the frequency of the second harmonic signal $2\omega_L$ corresponds with a resonant mode of the $Bi_2Te_3$ wafer, then the interference will be constructive and the second harmonic signal will be amplified. Thus, the amplitude of the second harmonic signal at a particular frequency $2\omega_L$ is dependent on the wafer spectrum at frequency $\omega_L$ and $2\omega_L$.

FIGS. 2C-2E show experimentally measured frequency characteristics of a $Bi_2Te_3$ wafer. That is, FIG. 2C illustrates a pump-band wafer spectrum of a cracked bismuth telluride wafer, FIG. 2D illustrates harmonic-band wafer spectrum and measured nonlinear harmonic signal of a cracked bismuth telluride wafer, and FIG. 2E illustrates an optical microscope image of a cracked bismuth telluride wafer and images of the displacement amplitudes for the four resonant modes shown in FIG. 2C.

FIG. 2C shows the measured pump-band ($\omega_L$) wafer spectrum $Y(\omega)$ averaged over the surface of a cracked $Bi_2Te_3$ wafer with four wafer modes (modes A-D) indicated. FIG. 2D shows the harmonic-band ($2\omega_L$) wafer spectrum $Y(\omega)$ (solid) and the measured nonlinear harmonic signal $Y(\omega)$ (dashed) that correspond to the pump-band wafer spectrum in FIG. 2C. Here, the harmonic-band wafer spectrum is the natural (linear) response of the wafer within the harmonic frequency band (e.g., the response is excited and measured at the same frequency $2\omega_L$. Conversely, the nonlinear harmonic signal is the signal generated at frequency $2\omega_L$ by exciting the wafer at frequency $\omega_L$. From FIG. 2E it is observed that for frequencies $\omega$ where the pump-band spectrum has a peak near $\omega$ and the harmonic-band spectrum has a peak near $2\omega$, there is a peak in the nonlinear harmonic at $2\omega$. Conversely, peaks (e.g. Modes A and C) in the pump range spectrum that correspond to low values in the harmonic range spectrum and do not generate a nonlinear signal. Peaks are observed in the nonlinear harmonic at frequencies that correspond to peaks in the harmonic-band wafer spectrum but no peak in the pump-band wafer spectrum. Here, the amplitude of the nonlinear harmonic peak is dependent on the quality factor (Q-factor) of the harmonic-band peak; higher Q-factor leads to higher vibration amplitudes and less energy dissipation. Additionally, the amplitude of the crack opening perturbation $a(x_3, t)$ is dependent on the location, orientation, and shape of the crack.

FIG. 2D shows an optical microscope image of the cracked wafer and the resonant modes A-D at frequencies $\omega=8.4$ (mode A), 9.3, (mode B), 10.5 (mode C), and 10.9 kHz (mode D). At each resonant mode, a standing wave is observed, which consists of nodes (blue) and antinodes (yellow), where the vibration amplitude is minimum and maximum, respectively. It is observed that modes A, B, and D produce vibration antinodes near the crack (boxed in red), whereas mode C produces a vibration node near the crack. This indicates that a pump frequency of $\omega_L=8.4$ kHz (mode A), 9.3 kHz (mode B) or 10.9 kHz (mode D) will induce crack breathing, but a pump frequency of $COL=10.5$ kHz (mode C) will not. To ensure that multiple (e.g., at least three) resonant modes are excited and that the first two harmonic bands ($2\omega_L$ and $3\omega_L$) do not overlap, a pump signal is selected that consists of a linear chirp over the range $\omega_L \in [\omega_L^-, \omega_L^+]$ for pump-band limits $\omega_L^-=8$ kHz and $\omega_L^+=12$ kHz.

Damage Quantification

To identify cracks, three damage metrics may be quantified from the measured vibration signal $Y(\omega)$. Cracked wafers are subjected to a decrease in the mean vibration amplitude of the resonance modes due to a reduction in the quality factor of the $Bi_2Te_3$ wafer and hysteretic nonlinearities. The mean resonance amplitude is quantified as follows:

$$M_{mean} = \text{mean}_{\omega \in [0,\infty)} Y(\omega) \quad (3)$$

Next, the harmonic amplitude metric is quantified as follows:

$$M_{harm} = \frac{\int_{\omega_L^-}^{\omega_L^+} Y(\omega)(Y(2\omega) + Y(3\omega))d\omega}{M_{mean} \cdot \int_{\omega_L^-}^{\omega_L^+} Y(\omega)d\omega} \quad (4)$$

Here, wafer resonance modes in the second and third harmonic-bands $\omega \in [2\omega_L^-, 2\omega_L^+]$ and $\omega \in [3\omega_L^-, 3\omega_L^+]$ are susceptible to excitation from outside sources such as bulk movement of the wafer, which may be amplified by wafer resonances in the harmonic-band. To filter out signals that are not generated by the nonlinearities in the crack, the harmonic spectra ($Y(\omega)$) for $\omega \in [2\omega_L^-, 2\omega_L^+]$ and $\omega \in [3\omega_L^-, 3\omega_L^+]$) is multiplied by the pump excitation spectrum ($Y(\omega)$) for $\omega \in [\omega_L^-, \omega_L^+]$). As a result, the integral in Eq. (4) will attribute greater weight to the harmonic signals that correspond to resonances in the pump-band and it will reduce the weight of harmonic signals due to other sources. Additionally, the mean resonance amplitude $M_{mean}$ is included in the denominator of Eq. (4) to amplify the harmonic metric for cracked wafers, which typically experience a reduction in the mean vibration amplitude of their resonance modes.

Finally, the modulated sideband amplitude metric is quantified as follows:

$$M_{mod} = \frac{\int_{\omega_H-\omega_L^-}^{\omega_H-\omega_L^+} Y(\omega_H)Y(\omega)d\omega + \int_{\omega_H-\omega_L^+}^{\omega_H-\omega_L^-} Y(\omega_H)Y(\omega)d\omega}{M_{mean} \cdot \int_{\omega_L^-}^{\omega_L^+} Y(\omega)d\omega} \quad (5)$$

Again in Eq. (5), the modulated sideband signal $Y(\omega)$ for $\omega \in [\omega_H+\omega_L^-, \omega_H+\omega_L^+]$ and $\omega \in [\omega_H+\omega_L^+, \omega_H+\omega_L^-])$ is multiplied by the probe excitation signal $Y(\omega_H)$ and the mean resonance amplitude $M_{mean}$ is included in the denominator to amplify the metrics for cracked wafers.

Example Processes for Implementing Embodiments of the Present Disclosure

FIGS. 3-7 illustrate properties associated with wafer defects. Embodiments herein may employ various metrics for quantifying damage to a wafer. For example, harmonic amplitude, modulation amplitude, and/or the mean frequency spectrum amplitude may be evaluated. In embodiments, high harmonic amplitudes, high modulation amplitudes, or low mean frequency spectrum amplitudes may imply that the wafer is damaged. Each wafer may then be classified as being either damaged or undamaged based on whether the metrics are above/below specific thresholds.

In FIG. 4, a time domain and frequency domain excitation signal is shown, consisting of a low-frequency pump signal and a high-frequency probe signal. FIG. 4 illustrates a signal measured by the laser vibrometer for the case of a cracked $Bi_2Te_3$ wafer. The opening/closing of the crack driven by the pump signal result in two nonlinear phenomenon: harmonic generation and modulation. Nonlinear harmonic generation results in frequency components at 2fL, 3fL, 4fL, etc. and 2fH, 3fH, 4fH, etc., where the amplitude of the signal reduces as the harmonic order increases. Practically, the high-frequency harmonics of the probe signal attenuate and are not considered. Nonlinear modulation results in frequency components at fH±fL, fH±2fL, fH±3fL, etc., where the amplitude of the modulations reduce as the modulations move away from fH.

FIG. 5 illustrates contact acoustic nonlinearity. That is, cracks open and close, resulting in nonlinearities, as depicted in FIG. 5.

In FIG. 6, it can be seen that a frequency response of undamaged wafers is less sensitive to the location of the excitation or supports. In certain embodiments, both sides (e.g., sides A, B) of a wafer may be excited so that their responses may be compared. For example, their consistency (e.g., A/B consistency) may be quantified as $$M_{con} = \frac{\langle Y_A, Y_B \rangle}{|Y_A|_1 |Y_B|_1},$$

where a high consistency implies an undamaged wafer while a low consistency implies a damaged wafer.

In FIG. 7, it is shown that cracking softens materials and reduces the resonance amplitude. Mean resonance amplitude can be expressed according to Eq. 3, and a high mean resonance amplitude may imply a crack free (e.g., undamaged) wafer while a low mean resonance amplitude may imply a cracked (e.g., damaged) wafer.

FIGS. 8A-8B illustrate an exemplary system architecture 800 for use with embodiments of the present disclosure. In FIGS. 8A-8B, a function generator 801 transmits a waveform through a power amplifier (not shown) to a piezoelectric transducer 802, which causes the transducer 802 to vibrate. The wafer 803 (e.g., $Bi_2Te_3$) under test rests on a ruby hemisphere 804 affixed to the transducer 802 and two foam supports 805. As the transducer 802 vibrates, it generates elastic waves that travel through the ruby hemisphere 804 into the wafer 803, which causes the wafer 803 to vibrate. The vibrations in the wafer 803 are then measured using a laser vibrometer 806. The vibrometer 806 signal is filtered and digitized using a band-pass filter (not shown) and oscilloscope 807, respectively. To ensure that all of the vibrating modes of the wafer 803 are captured, the system may measure the elastic waves at several points across the wafer 803 surface by moving the wafer 803 via a motorized x-y stage 809 controlled by a motor controller (not shown).

In embodiments, a number of points across the wafer surface that are measured or scanned may be determined or selected based upon dimensions of the wafer. For example, in certain embodiments, the number of points across the wafer surface at which waves or other metrics are measured, scanned, or obtained may be one (1), five (5), twenty-five (25) or the like. Further, in certain embodiments, the number of points across the wafer surface at which waves or other metrics are measured, scanned, or obtained may be determined according to dimensions of the wafer, such as a single measurement per square millimeters ($mm^2$) of the wafer. By way of further example, a wafer having dimensions 20 mm×30 mm, resulting in 600 $mm^2$, may be measured at 600 points (e.g., once per square millimeter); alternatively, the wafer may be measured at a subset (e.g., 1, 5, 25, or the like) of its total points to speed up overall measurement or scanning time. Accordingly, embodiments herein enable a reduction in a required number of measurements across an entire wafer without sacrificing measurement accuracy or sufficiency. It will be appreciated that the aforementioned non-limiting examples of dimensions and numbers of measurement points associated with wafers are for illustrative purposes and are not intended to limit the scope of the present disclosure. Accordingly, other dimensions and numbers of measurement points are within the scope of the present disclosure.

In embodiments, the motor controller may be provided by way of a computing device 808. Computing device 808 may further be configured to receive oscilloscope 807 and other data as well as instructions for function generator 801.

Using the experimental setup shown in FIGS. 8A-8B, each wafer 803 may be excited with an acoustic signal that consists of two parts: a low-frequency fL, high-amplitude pump signal that excites cracks in the wafer 803 and causes them to periodically open and close; and a high-frequency fH, low-amplitude probe signal that is permitted to pass through the cracks when they close, and prohibited from passing through the cracks when they open. By periodically permitting and/or prohibiting the waves to pass through the crack, nonlinear signals that are characteristic to cracked wafers can be generated. In embodiments, to ensure that cracks are sufficiently interrogated, the frequency of the excitation signal is swept (e.g., from 8 kHz to 12 kHz) to excite multiple vibrating modes (e.g., three vibration modes) of the wafer 803.

It will be appreciated that the processes performed using example architecture 800 may be partially-automated or fully-automated through the use of the components depicted in FIGS. 8A and 8B.

FIGS. 9A-9C and 10 illustrate exemplary crack detection results associated with embodiments disclosed herein. FIGS. 9A-9C show the acoustic metrics from Eqs. (3)-(5) for each of the example $Bi_2Te_3$ wafers (e.g., in FIG. 9A where a crack is detected and FIG. 9B where no crack is detected). In FIG. 9C, optical damage is illustrated by dots identifying whether the wafer is cracked (e.g. darker shade of dot) or crack-free (e.g., lighter shade of dot), based on optical microscopy. From FIG. 9C, it is observed that it is possible to place a hyperplane (e.g., diagonal line in FIG. 9C) that separates the cracked and crack-free wafers such that cracked wafers are correctly identified with a total error of ~4.3% (4/94 $Bi_2Te_3$ wafers) and the crack free wafers are currently identified with a total error of ~7.5% (7/94 $Bi_2Te_3$ wafers). Thus, using the metrics in Eqs. (3)-(5) results in quasi-linearly separable $Bi_2Te_3$ wafer data points, which means that the cracks can be accurately distinguished via a single linear classifier (a plane). More complex classification techniques such as support vector machines, decision trees, or boosting may be used in embodiments herein to further reduce the classification error.

To understand why cracks were not detected in some $Bi_2Te_3$ wafers, a subsample of $Bi_2Te_3$ wafers were observed via optical microscopy and X-ray computed tomography (CT). FIGS. 9B and 10 show the optical microscope image and CT image of the crack cross section for a cracked $Bi_2Te_3$ wafer that was misclassified acoustically and a cracked $Bi_2Te_3$ wafer that was correctly classified acoustically. The larger average initial crack opening a0=73 mm requires a higher crack opening perturbation amplitude |a| to close the crack and induce breathing, compared to the average initial crack of opening a0=48 mm. This results in low harmonic and sideband modulation peaks, which inhibits crack detection. To induce breathing in a crack with large initial opening a0, the excitation signal amplitude must be increased. However, sufficiently large excitation signal amplitude will also result in a periodic loss of contact between the ruby hemisphere and the $Bi_2Te_3$ wafer that induces nonlinear harmonic and sideband generation in both cracked and crack-free wafers, which can impede crack detection. As a result, the acoustic crack detection technique is more effective for detecting cracks with small initial crack openings as opposed to large initial crack openings. In practice, a crack with a large initial crack opening is easily identifiable optically with little to no magnification, whereas a crack with a small initial crack opening is more difficult to identify optically. Thus, the acoustic crack detection technique serves a critical role in identifying cracks with small initial crack opening. Additionally, no crack growth is observed due to the crack breathing, but it is noted that the breathing process has the potential to remove material from one or both crack faces. However, in practice, any cracking in the wafer typically results in disposal of the wafer, and, thus any subsequent damage to an already cracked thermoelectric wafer is inconsequential.

FIGS. 11A and 11B illustrate exemplary machine learning techniques for use with embodiments of the present disclosure. In FIG. 11A, data samples are randomly separated 1101 into a training data set and a testing data set. A classifier is then trained 1102 using the training data set. The classifier is then tested 1103 using the training data set and the testing data set. In FIG. 11B, it is shown that the operations depicted in FIG. 11A create a strong classifier for identifying damaged and undamaged wafers by combining multiple weak classifiers (e.g., weak classifier 1, weak classifier 2, and weak classifier 3 in FIG. 11B). This also provides adaptability to changes in manufacturing processes, environmental conditions, and the like.

FIG. 12 illustrates exemplary machine learning results associated with embodiments disclosed herein. Defects detected associated with a given wafer may be analyzed according to type, dimensions (e.g., x, y, z), surface, volume, and more. Each defect, accordingly, is associated with its own feature vector that may be utilized for training a machine learning model. Accordingly, a machine learning model may be trained using known defects and associated data, and the trained machine learning model may be used to classify wafers according to various attributes of their feature vectors. Metrics may include acoustic nonlinearity (e.g., harmonics for both sides, A/B, of a wafer; modulation for both sides, A/B, of a wafer), resonance mode amplitude for both sides (e.g., A/B) of a wafer, and/or resonance mode consistency.

Exemplary Experimental Results

FIG. 14 illustrates exemplary wafer defects for inspection according to embodiments disclosed herein. Wafer defects are each analyzed and documented according to type, dimensions (e.g., x, y, z), surface, volume, and more. Each defect, accordingly, is associated with its own feature vector that may be utilized for training a machine learning model.

FIG. 15 illustrates exemplary optical wafer defect inspection according to embodiments disclosed herein. In FIG. 15, example optical microscopy results are shown including a low-resolution 2D scan of the entire wafer surface and high-resolution 3D scans of manually selected regions of interest, which provide an image and a height-map (color) of the region to measure the depth of any defects. Optical microscopy inspection of the wafers may be performed using an imaging system (e.g., a Keyence VHX 6000 optical microscope). Defects are optically identified in the wafers using a two-step process. First, a low-resolution (50× magnification) 2D scan is performed over the surface of the wafer using directional lighting to highlight defects. From this low-resolution image, regions with potential defects are manually identified. A high-resolution (500× magnification) 3D scan is then performed over each of the identified regions to produce an optical image and a height map of the potential defect. FIG. 15 shows an example of a low-resolution image of a wafer with inset images showing a high-resolution height map overlaying the optical microscope image of potential defects. This two-step optical measurement process is repeated on both sides (A and B) of each wafer. A wafer is then classified as being damaged if any channel, crack, or hole is deeper than 110 rim, based on a fracture analysis of the manufacturing process.

Example Apparatus for Implementing Embodiments of the Present Disclosure

Embodiments of the present disclosure may be implemented using one or more modules that may be embodied by one or more computing systems, such as apparatus 1500 shown in FIG. 13. The apparatus 1500 may include a processor 1502, a memory 1501, input/output circuitry 1503, and communications circuitry 1504. The apparatus 1500 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 1500 may provide or supplement the functionality of particular circuitry. For example, the processor 1502 may provide processing functionality, the memory 1501 may provide storage functionality, the communications circuitry 1504 may provide network interface functionality, and the like.

In some embodiments, the processor 1502 (and/or co-processor or any other processing circuitry assisting or otherwise associated with the processor) may be in communication with the memory 1501 via a bus for passing information among components of the apparatus. The memory 1501 may be non-transitory and may include, for example, one or more volatile and/or non-volatile memories. In other words, for example, the memory may be an electronic storage device (e.g., a computer readable storage medium). The memory 1501 may be configured to store information, data, content, applications, instructions, or the like, for enabling the apparatus to carry out various functions in accordance with example embodiments of the present disclosure.

The processor 1502 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 1502 may be configured to execute instructions stored in the memory 1501 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 1500 may include input/output circuitry 1503 that may, in turn, be in communication with processor 1502 to provide output to the user and, in some embodiments, to receive an indication of a user input. The input/output circuitry 1503 may comprise a user interface and may include a display and may comprise a web user interface, a mobile application, a client device, a kiosk, or the like. In some embodiments, the input/output circuitry 1503 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 1501, and/or the like).

The communications circuitry 1504 may be any means such as a device or circuitry embodied in either hardware or a combination of hardware and software that is configured to receive and/or transmit data from/to a network and/or any other device, circuitry, or module in communication with the apparatus 1500. In this regard, the communications circuitry 1504 may include, for example, a network interface for enabling communications with a wired or wireless communication network. For example, the communications circuitry 1504 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

In some embodiments of the present disclosure, a method for detecting wafer defects includes exciting a wafer using an acoustic signal to cause the wafer to exhibit vibrations. In some of these embodiments, the method further includes measuring one or more of linear frequency response metrics or nonlinear frequency responses metrics associated with the vibrations. In some of these embodiments, the method further includes identifying any defects in the wafer based at least in part on one or more of the linear frequency response metrics or nonlinear frequency responses metrics.

In some of these embodiments, measuring the one or more of the linear frequency response metrics or nonlinear frequency responses metrics associated with the vibrations comprises using a laser vibrometer. In some of these embodiments, the acoustic signal comprises a low-frequency $f_L$, high-amplitude pump signal that is configured to excite cracks in the wafer, causing the cracks to periodically open and close, and a high-frequency $f_H$, low-amplitude probe signal that is configured to pass through the cracks when the cracks close, and prohibited from passing through the cracks when the cracks open. In some of these embodiments, the low-frequency $f_L$, high-amplitude pump signal comprises a linear chirp. In some of these embodiments, the low-frequency $f_L$, high-amplitude pump signal covers one or more of one or more fundamental resonance modes of the wafer or a first three or four resonance modes of the wafer. In some of these embodiments, the high-frequency $f_H$, low-amplitude probe signal comprises a fixed high frequency signal. In some of these embodiments, the high-frequency $f_H$, low-amplitude probe signal is approximately 10× the low-frequency $f_L$, high-amplitude pump signal.

In some of these embodiments, the linear frequency response metrics or nonlinear frequency responses metrics associated with the vibrations comprise one or more of a mean resonance amplitude $f_L$, a harmonic amplitude, $nf_L$, or a modulated sideband amplitude $f_H \pm nf_L$, where n is an integer.

In some of these embodiments, the method further includes classifying the wafer as damaged or undamaged based at least in part on one or more of the linear frequency response metrics or nonlinear frequency responses metrics associated with the vibrations. In some of these embodiments, classifying the wafer is based at least in part on a trained machine learning model, where the trained machine learning model comprises one or more machine learning models trained using training data comprising known wafer defect data.

In some of these embodiments, exciting the wafer comprises positioning the wafer on a top surface of a hemisphere, where the hemisphere is mounted to a transducer to achieve quasi-point contact between the transducer and the wafer. In some of these embodiments, exciting the wafer further comprises transmitting, using a function generator, a waveform to the transducer to generate standing elastic waves in the wafer.

In some of these embodiments, the hemisphere comprises a ruby hemisphere. In some of these embodiments, the transducer comprises a piezoelectric transducer.

In some of these embodiments, the method further includes measuring a surface velocity of the wafer in a time-domain as the wafer is excited. In some of these embodiments, the method further includes filtering and digitizing a signal representing the surface velocity and transforming the signal from the time-domain to a frequency-domain via a Fast Fourier Transform. In some of these embodiments, one or more of the linear frequency response metrics or nonlinear frequency responses metrics associated with the vibrations are measured from the frequency-domain signal and combined to identify defects in the wafer. In some of these embodiments, multiple vibrating modes of the wafer are excited to generate resonant vibrations that cause crack breathing.

In some of these embodiments, the method further includes translating the wafer using a motorized x-y stage to measure multiple locations on a wafer surface.

In some of these embodiments, the wafer comprises a plurality of measurement points and the measuring the one or more of linear frequency response metrics or nonlinear frequency responses metrics associated with the vibrations comprises measuring a subset of the plurality of measurement points. In some of these embodiments, the subset of the plurality of measurement points comprises one or more measurement points. In some of these embodiments, the subset of the plurality of measurement points comprises a number of measurement points determined based at least in part on dimensions of the wafer.

In some embodiments of the present disclosure, an apparatus for detecting wafer defects comprises at least one processor and at least one non-transitory storage medium having stored thereon instructions that, with the at least one processor, cause the apparatus to excite a wafer using an acoustic signal to cause the wafer to exhibit vibrations. In some of these embodiments, the apparatus is further caused to measure one or more of linear frequency response metrics or nonlinear frequency responses metrics associated with the vibrations. In some of these embodiments, the apparatus is further caused to identify any defects in the wafer based at least in part on one or more of the linear frequency response metrics or nonlinear frequency responses metrics.

In some of these embodiments, measuring the one or more of the linear frequency response metrics or nonlinear frequency responses metrics associated with the vibrations comprises using a laser vibrometer. In some of these embodiments, the acoustic signal comprises a low-frequency $f_L$, high-amplitude pump signal that is configured to excite cracks in the wafer, causing the cracks to periodically open and close, and a high-frequency $f_H$, low-amplitude probe signal that is configured to pass through the cracks when the cracks close, and prohibited from passing through the cracks when the cracks open. In some of these embodiments, the low-frequency $f_L$, high-amplitude pump signal comprises a linear chirp. In some of these embodiments, the low-frequency $f_L$, high-amplitude pump signal covers one or more of one or more fundamental resonance modes of the wafer or a first three or four resonance modes of the wafer. In some of these embodiments, the high-frequency $f_H$, low-amplitude probe signal comprises a fixed high frequency signal. In some of these embodiments, the high-frequency $f_H$, low-amplitude probe signal is approximately 10× the low-frequency $f_L$, high-amplitude pump signal.

In some of these embodiments, the linear frequency response metrics or nonlinear frequency responses metrics associated with the vibrations comprise one or more of a mean resonance amplitude $f_L$, a harmonic amplitude, $nf_L$, or a modulated sideband amplitude $f_H \pm nf_L$, where n is an integer.

In some of these embodiments, the apparatus is further caused to classify the wafer as damaged or undamaged based at least in part on one or more of the linear frequency response metrics or nonlinear frequency responses metrics associated with the vibrations. In some of these embodiments, classifying the wafer is based at least in part on a trained machine learning model, where the trained machine learning model comprises one or more machine learning models trained using training data comprising known wafer defect data.

In some of these embodiments, exciting the wafer comprises positioning the wafer on a top surface of a hemisphere, where the hemisphere is mounted to a transducer to achieve quasi-point contact between the transducer and the wafer. In some of these embodiments, exciting the wafer further comprises transmitting, using a function generator, a waveform to the transducer to generate standing elastic waves in the wafer.

In some of these embodiments, the hemisphere comprises a ruby hemisphere. In some of these embodiments, the transducer comprises a piezoelectric transducer.

In some of these embodiments, the apparatus is further caused to measure a surface velocity of the wafer in a time-domain as the wafer is excited. In some of these embodiments, the apparatus is further caused to filter and digitize a signal representing the surface velocity and transforming the signal from the time-domain to a frequency-domain via a Fast Fourier Transform. In some of these embodiments, one or more of the linear frequency response metrics or nonlinear frequency responses metrics associated with the vibrations are measured from the frequency-domain signal and combined to identify defects in the wafer. In some of these embodiments, multiple vibrating modes of the wafer are excited to generate resonant vibrations that cause crack breathing.

In some of these embodiments, the apparatus is further caused to translate the wafer using a motorized x-y stage to measure multiple locations on a wafer surface.

In some of these embodiments, the wafer comprises a plurality of measurement points and the measuring the one or more of linear frequency response metrics or nonlinear frequency responses metrics associated with the vibrations comprises measuring a subset of the plurality of measurement points. In some of these embodiments, the subset of the plurality of measurement points comprises one or more measurement points. In some of these embodiments, the subset of the plurality of measurement points comprises a number of measurement points determined based at least in part on dimensions of the wafer.

In some of these embodiments, the wafer comprises bismuth telluride ($Bi_2Te_3$).

In some embodiments, a system for detecting defects in a wafer comprises a function generator and transducer for exciting a wafer using an acoustic signal to cause the wafer to exhibit vibrations. In some of these embodiments, the system further comprises a laser vibrometer for measuring one or more of linear frequency response metrics or nonlinear frequency responses metrics associated with the vibrations. In some of these embodiments, the system further comprises a computing device configured to identify, based at least in part on the one or more of linear frequency response metrics or nonlinear frequency responses metrics associated with vibrations, any defects in the wafer. In some of these embodiments, the system further comprises a hemisphere positioned between the transducer and the wafer such that elastic waves travel through the hemisphere into the wafer.

The present invention is not to be limited in scope by the embodiments disclosed herein, which are intended as single illustrations of individual aspects of the invention, and any which are functionally equivalent are within the scope of the invention. Various modifications to the models and methods of the invention, in addition to those described herein, will become apparent to those skilled in the art from the foregoing description and teachings, and are similarly intended to fall within the scope of the invention. Such modifications or other embodiments can be practiced without departing from the true scope and spirit of the invention.

It should be understood that the examples and embodiments described herein are for illustrative purposes only and that various modifications or changes in light thereof will be suggested to persons skilled in the art and are to be included within the spirit and purview of this application.

What is claimed is:

1. A method for detecting wafer defects, comprising:
   exciting a wafer using an acoustic signal to cause the wafer to exhibit vibrations;
   measuring one or more of linear frequency response metrics or nonlinear frequency responses metrics associated with the vibrations; and
   identifying any defects in the wafer based at least in part on one or more of the linear frequency response metrics or nonlinear frequency responses metrics.

2. The method of claim 1, wherein measuring the one or more of the linear frequency response metrics or nonlinear frequency responses metrics associated with the vibrations comprises using a laser vibrometer.

3. The method of claim 1, wherein the acoustic signal comprises:
   a low-frequency $f_L$, high-amplitude pump signal that is configured to excite cracks in the wafer, causing the cracks to periodically open and close; and
   a high-frequency $f_H$, low-amplitude probe signal that is configured to pass through the cracks when the cracks close, and prohibited from passing through the cracks when the cracks open.

4. The method of claim 3, wherein the low-frequency $f_L$, high-amplitude pump signal comprises a linear chirp.

5. The method of claim 3, wherein the low-frequency $f_L$, high-amplitude pump signal covers one or more of one or more fundamental resonance modes of the wafer or a first three or four resonance modes of the wafer.

6. The method of claim 3, wherein the high-frequency $f_H$, low-amplitude probe signal comprises a fixed high frequency signal.

7. The method of claim 3, wherein the high-frequency $f_H$, low-amplitude probe signal is approximately 10× the low-frequency $f_L$, high-amplitude pump signal.

8. The method of claim 1, wherein the linear frequency response metrics or nonlinear frequency responses metrics associated with the vibrations comprise one or more of a mean resonance amplitude $f_L$, a harmonic amplitude, $nf_L$, or a modulated sideband amplitude $f_H \pm nf_L$, where n is an integer.

9. The method of claim 1, further comprising classifying the wafer as damaged or undamaged based at least in part on one or more of the linear frequency response metrics or nonlinear frequency responses metrics associated with the vibrations.

10. The method of claim 9, wherein classifying the wafer is based at least in part on a trained machine learning model, wherein the trained machine learning model comprises one or more machine learning models trained using training data comprising known wafer defect data.

11. The method of claim 1, wherein exciting the wafer comprises:
   positioning the wafer on a top surface of a hemisphere, wherein the hemisphere is mounted to a transducer to achieve quasi-point contact between the transducer and the wafer; and
   transmitting, using a function generator, a waveform to the transducer to generate standing elastic waves in the wafer.

12. The method of claim 1, wherein the wafer comprises a plurality of measurement points.

13. The method of claim 12, wherein the measuring the one or more of linear frequency response metrics or nonlinear frequency responses metrics associated with the vibrations comprises measuring a subset of the plurality of measurement points.

14. The method of claim 13, wherein the subset of the plurality of measurement points comprises a number of measurement points determined based at least in part on dimensions of the wafer.

15. The method of claim 1, further comprising:
   measuring a surface velocity of the wafer in a time-domain as the wafer is excited.

16. The method of claim 15, further comprising:
   filtering and digitizing a signal representing the surface velocity and transforming the signal from the time-domain to a frequency-domain via a Fast Fourier Transform.

17. The method of claim 16, wherein one or more of the linear frequency response metrics or nonlinear frequency responses metrics associated with the vibrations are measured from the frequency-domain signal and combined to identify defects in the wafer.

18. The method of claim 11, wherein multiple vibrating modes of the wafer are excited to generate resonant vibrations that cause crack breathing.

19. The method of claim 1, further comprising translating the wafer using a motorized x-y stage to measure multiple locations on a wafer surface.

20. A method for detecting wafer defects, comprising:
  exciting a wafer using an acoustic signal to cause the wafer to exhibit vibrations;
  measuring, at one or more measurement points of the wafer, one or more of linear frequency response metrics or nonlinear frequency responses metrics associated with the vibrations; and
  identifying any defects in the wafer based at least in part on one or more of the linear frequency response metrics or nonlinear frequency responses metrics associated with the one or more measurement points of the wafer.

* * * * *